(12) United States Patent
Thankachan et al.

(10) Patent No.: US 7,736,525 B2
(45) Date of Patent: Jun. 15, 2010

(54) METHOD OF MAKING AN ALKOXYLATED POLYETHYLENIMINE PRODUCT

(75) Inventors: Chacko Thankachan, West Bloomfield, MI (US); Klaus J. Friedrich, Detroit, MI (US); Daniel E. Coker, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 11/815,643

(22) PCT Filed: Feb. 7, 2006

(86) PCT No.: PCT/US2006/004457

§ 371 (c)(1), (2), (4) Date: Oct. 27, 2008

(87) PCT Pub. No.: WO2006/086485

PCT Pub. Date: Aug. 17, 2006

(65) Prior Publication Data

US 2009/0069501 A1    Mar. 12, 2009

Related U.S. Application Data

(60) Provisional application No. 60/650,990, filed on Feb. 8, 2005, provisional application No. 60/650,914, filed on Feb. 8, 2005.

(51) Int. Cl.
C02F 1/00    (2006.01)

(52) U.S. Cl. .......... 210/766; 210/767; 210/774; 524/800; 525/417; 525/540; 528/424; 528/499; 528/500; 528/501; 528/503

(58) Field of Classification Search .......... 525/540, 525/417; 528/424, 483, 499, 500, 501, 503; 524/800; 210/767, 774, 766
See application file for complete search history.

(56) References Cited

U.S. PATENT DOCUMENTS 2,208,095 A * 7/1940 Esselman et al. .......... 528/381
2,856,389 A * 10/1958 Fusco et al. .......... 526/237
5,846,453 A    12/1998 Mohr et al.
6,235,940 B1 * 5/2001 Mohr et al. .......... 564/468
6,451,961 B2    9/2002 Suzuki et al.
2001/0014730 A1    8/2001 Suzuki et al.

FOREIGN PATENT DOCUMENTS

| DE | 19544739 | | 6/1997 |
| GB | 805018 | * | 11/1958 |
| WO | WO 97/23546 A1 | | 7/1997 |
| WO | WO 97/48673 A1 | | 12/1997 |
| WO | WO 99/16811 | * | 4/1999 |
| WO | WO 99/16811 A1 | | 4/1999 |

OTHER PUBLICATIONS

Ebewele, Robert O., Polymer Science and Technology; CRC Press, Boca Raton, FL; 2000.*
Herbert Bartl, "Makromolekulare Stoffe", vol. E20, 1987, pp. 1367-1370.
Houben-Weyl, Methoden Der Organischen Chemie, vol. XIV/2, 1963, pp. 440-444.
International Search Report, International Application No. PCT/US2006/004457, May 15, 2006, 4 pages.
English language abstract for DE19544739 extracted from espacenet.com dated Aug. 3, 2007.

* cited by examiner

*Primary Examiner*—David Wu
*Assistant Examiner*—Robert Jones, Jr.
(74) *Attorney, Agent, or Firm*—Howard & Howard Attorneys PLLC

(57) ABSTRACT

A method of making an alkoxylated polyethyleneimine (APEI) product having reduced discoloration includes treating a composition including a component selected from the group of polyethyleneimine (PEI), APEI intermediate, and combinations thereof that is used to make the APEI product. The method of treating the composition includes heating a composition that includes an adduct of a conjugate base and PEI, water, and the component at a temperature of from 158 to 338° F. for a period of at least three hours in the absence of additional water in order to substantially decompose the adduct in the composition. The aqueous solutions of APEI product thus made have Gardner color values of less than 6.

32 Claims, 1 Drawing Sheet

METHOD OF MAKING AN ALKOXYLATED POLYETHYLENIMINE PRODUCT

RELATED APPLICATIONS

This application claims priority to and all the advantages of International Patent Application No. PCT/US2006/004457, filed on Feb. 7, 2006, which claims priority to U.S. Provisional Patent Application No. 60/650,990, filed on Feb. 8, 2005 and U.S. Provisional Patent Application No. 60/650,914, filed on Feb. 8, 2005.

BACKGROUND OF THE INVENTION

1. Field of the Invention

The subject invention relates to a method of making an alkoxylated polyethyleneimine product. More specifically, the subject invention relates to a method of treating a composition including at least one of a polyethyleneimine and an alkoxylated polyethyleneimine intermediate to improve the appearance of the alkoxylated polyethyleneimine product in an aqueous solution.

2. Description of the Related Art

Alkoxylated polyethylenimines (APEIs) are known in the art, as are methods of making APEI products including the APEIs. Among the APEIs, propoxylated polyethylenimines (PPEIs) and ethoxylated polyethylenimines (EPEIs) are most common in commercial applications. The EPEIs are commonly used in consumer products, especially laundry detergents, and generally function as dispersants by chelating cationic particles, such as clay particles, and holding them in solution. The EPEIs hold the particles in suspension until the particles are removed through a rinsing process, thus preventing the particles from re-depositing on the fabric in the laundry.

Current methods of making the APEI products start from a composition including polyethyleneimines (PEIs). A method of making the composition including the PEIs is by reacting ethylenediamine (EDA) and ethylenimine (EI) under acid catalysis, in solvents such as water. An example of a common EI is aziridine, which is a three-member ring having a reactive nitrogen. The EI is polymerized through a ring-opening reaction involving the reactive nitrogen of the aziridine. The reaction is maintained until the amount of unreacted EI falls below a predetermined level. The resulting polyethylenimines (PEIs) in the composition have primary, secondary, and tertiary amine functionalities that are available for further chemical conversion, e.g. alkoxylation with alkylene oxides such as ethylene oxide to form APEI. The ethoxylation of PEIs is described in Houben-Weyl, Methoden der organischen Chemie, 4. Ed., Vol. 14/2, p. 440 ff. (1963) and Vol. E 20, p. 1367 f. (1987).

One of the problems with current APEI products is discoloration in aqueous solutions including the APEI products. Incorporation of APEI products that cause significant discoloration in consumer products is undesirable since it can distort the desired color and appearance of the consumer products, which in turn can diminish consumer appeal. The discoloration of the aqueous solutions including the APEI products is typically measured using a UV-VIS spectrophotometer or by comparing the aqueous solutions including the APEI products to color standards such as Gardner color standards. In such measurements, the APEI products are diluted with solvents like water or alcohols, e.g. methanol or ethanol, THF, DMF or aqueous acids, to concentrations that are practical to determine coloristic properties. These concentrations can range from 5 to 30% by weight for the active polymer. Measurements of the coloristic properties are conducted at various wavelengths that can range from 350 to 800 nm and are carried out in one or two channel UV/Vis-spectrophotometers.

It is known in the art that impurities present in compositions including the PEI produce significant discoloration and high color in the aqueous solutions of APEI product made from them. However, there is no way of knowing from the appearance of the composition including the PEI whether aqueous solutions of APEI product with sufficiently low color can be made, since the compositions including the PEI are generally of low color, in the range of 1 to 3 by the Gardner standard.

Hydrides, such as sodium or potassium borohydride, are thought to improve the color of the aqueous solutions of APEI product and are often used in the manufacturing process. The aqueous solutions of APEI product manufactured following the conventional processes are highly colored and the formation of color bodies is unpredictable. For the aqueous solutions of APEI product manufactured following the conventional processes, Gardner color values are typically above 10 and often in the range of 14-18. Aqueous solutions of APEI product having Gardner color values greater than 10 are considered significantly discolored, and their utility in consumer products is inhibited. It is desirable to obtain aqueous solutions of APEI product with Gardner color values less than 6, which are presently unattainable through the use of the hydride or other measures alone.

U.S. Pat. No. 6,451,961 to Suzuki et al. suggests a method of treating compositions including PEI that have been produced from EI, which in turn was manufactured via a dehydration reaction of monoethanolamine in the presence of a catalyst. The method includes adding water to the PEI in an amount of from 1 to 95 parts water, based on the weight of the PEI to form the composition including the PEI. At least 15 percent of the added water is then distilled out of the composition at a temperature of from 212 to 392° F. and at reduced pressure to remove volatile impurities such as excess ethanolamine and other low-boiling residual components such as ammonia, lower alkyl amines, and aldehydes. According to the '961 patent, those volatile impurities cause offensive smell and a reduction in stability of the polyethyleneimines when present.

While it is obvious that water and other volatile compounds that are not chemically bound to the PEIs will be more quickly removed from the composition at higher temperatures, there could be factors that control the outcome of alkoxylation of the PEIs other than the removal of volatile impurities. Specific factors that may control the outcome of alkoxylation include the reaction of products of carbonyl compounds with the nitrogen functionality of the PEIs, subsequent removal of those products through distillation, and possible structural changes of the PEIs due to the removal of cross-linking building blocks. Such factors are not accounted for by the treatment method of the '961 patent. Furthermore, ethanolamine and ammonia, which are removed in the treatment method of the '961 patent, are not considered harmful in the sense of causing discoloration. More specifically, the functionalities of the ethanolamine and ammonia are also found in compositions including the PEI and/or the APEI product. Ethanolamine and ammonia are known to readily participate in the alkoxylation process, leading to colorless APEI products. Hence many of the volatile impurities removed in the '961 patent need not be removed to reduce discoloration of the aqueous solutions of APEI product, and the drawbacks of the presence of the ethanolamine and ammonia are not experienced by the consumer since the ethanolamine and ammonia are consumed during the production of the APEI product, thus yielding minute amounts of high molecular weight products in the APEI product that are chemically similar to the APEI. Finally, the presence of water in the composition including the PEI negatively affects alkoxylation beyond the reaction of one equivalent mole of alkylene oxide for each functionality of the PEI. As a result, the presence of excessive quantities of water during alkoxylation to produce the APEI product, which has more than one mole of alkylene oxide for each functionality of the PEI, is undesirable.

There remains an opportunity to provide a method of making APEI products that consistently exhibit improved color properties in aqueous solutions of the APEI products, namely Gardner color values of less than 6, without affecting the chemical structure or properties of the APEI products.

SUMMARY OF THE INVENTION AND ADVANTAGES

The subject invention provides a method of treating a composition and a method of making an alkoxylated polyethyleneimine (APEI) product. The composition includes an adduct of a conjugate base and polyethyleneimine (PEI). The composition also includes a component selected from the group of PEI, APEI intermediate, and combinations thereof. Optionally, the composition further includes water. The method further includes the step of heating the composition at a temperature of from 158 to 338° F. for a period of at least 3 hours in the absence of additional water to substantially decompose the adduct in the composition.

The conjugate base is present in the composition as a product of a catalyst used to form the PEI. The adduct was unexpectedly found to cause significant discoloration in aqueous solutions of the APEI product. By heating the composition within the temperature range of from 158 to 338° F., absent additional water besides the water remaining after the PEI is made, the adduct in the composition is decomposed to improve color properties in aqueous solutions of the APEI products made from the composition, while retaining other impurities in the composition that are not harmful in the sense of causing discoloration. Furthermore, the adduct is decomposed without causing structural changes in the PEI and/or APEI intermediate in the composition.

DETAILED DESCRIPTION OF A PREFERRED EMBODIMENT

Figure 1:
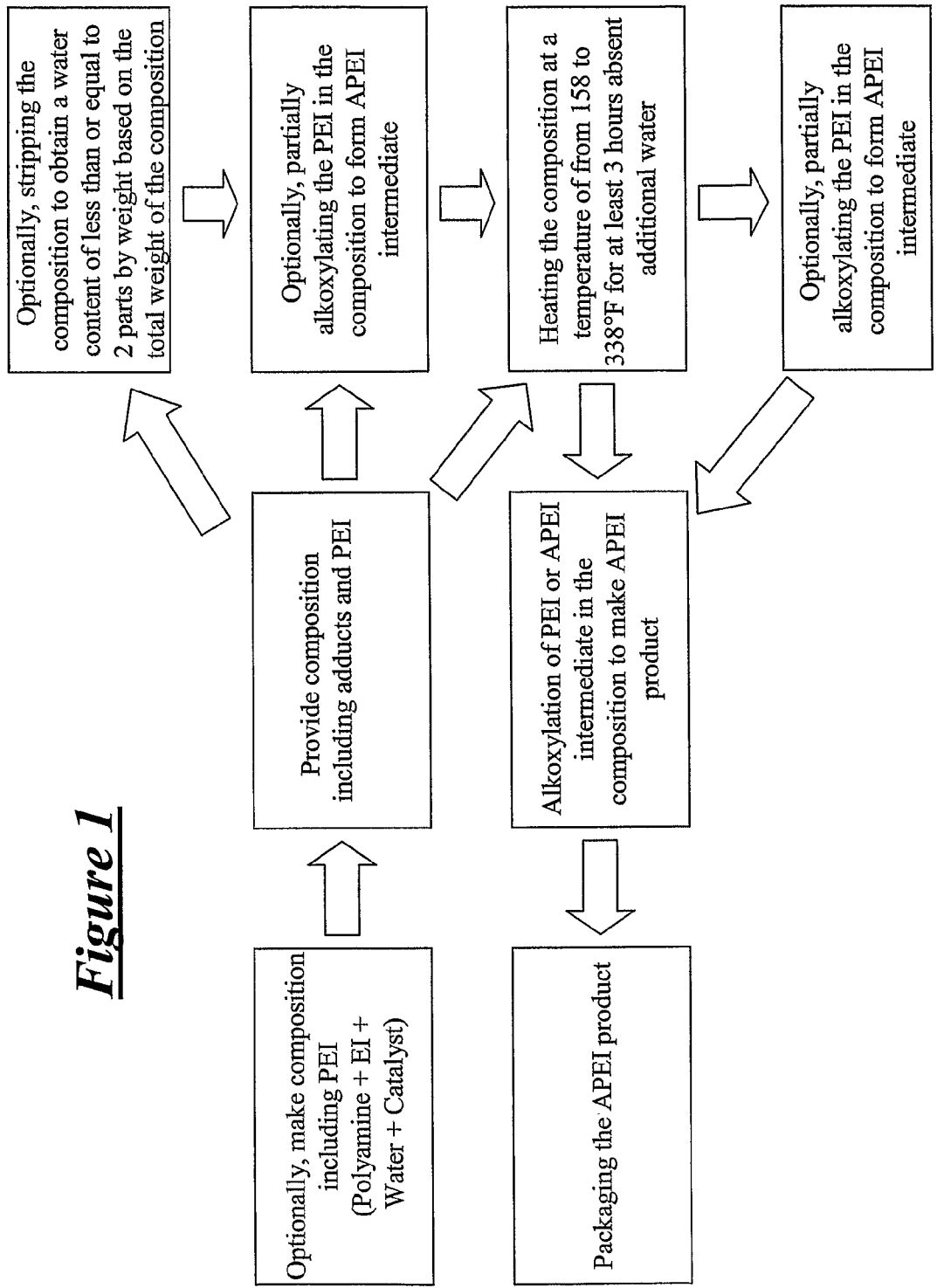
FIG. 1 is a flow chart of one method of making the alkoxylated polyethyleneimine product of the present invention.

Referring to FIG. 1, a method of making an alkoxylated polyethyleneimine (APEI) product may include the step of making a composition including polyethyleneimine (PEI). The PEI is made by starting with a polyamine such as ethylene diamine (EDA), ethylenimine (EI) such as aziridine, water, and an acid catalyst. Acid catalysts such as sulfuric acid, carbonic acid, or any lower carboxylic acid catalyst, e.g., C1 to C6, may be used for the production of the composition including the PEI. Specific examples of suitable acid catalysts include sulfuric, formic, and carbonic acids. In the case of carbonic acid, which is unstable under normal reaction conditions, it can be generated in situ by the use of water and carbon dioxide. The PEIs in the composition are available at a range of molecular weights and have a number average molecular weight of at least 150, more preferably from 600 to 30,000. An example of a composition including PEI is one formed from carbonic acid catalysis, in the presence of water, in which the PEI has a number average molecular weight of about 600.

The catalysts used to make the PEI in the composition form adducts with the PEI. As is known in the art, conjugate bases, i.e., sulfate, formate, or carbonate ions, depending on which catalyst is used, and the adducts those bases form with the PEI, exhibit different chemical characteristics when compositions including one or more of those adducts are further processed.

The resulting PEI in the composition has primary and secondary amine functionalities that are available for further alkoxylation with alkylene oxides, such as ethylene oxide or propylene oxide, to make APEI products such as ethoxylated polyethyleneimines (EPEIs), propoxylated polyethylenimines (PPEIs), respectively. The ethoxylation of PEIs is described in Houben-Weyl, Methoden der organischen Chemie, 4. Ed., Vol. 14/2, p. 440 ff. (1963) and Vol. E 20, p. 1367 f. (1987), both of which are hereby incorporated by reference.

A ratio of primary, secondary and tertiary amine functionalities in the PEI can be determined via an established NMR-methodology. Table 1 summarizes data from recent analyses of PEI made under acid catalysis and having a number average molecular weight of about 600:

TABLE 1

| Sample | Primary amine functionalities | Secondary amine functionalities | Tertiary amine functionalities |
| --- | --- | --- | --- |
| PEI, $M_n = 600$ | 49% of total amine groups (13.3 g/100 g) | 25% of total amine groups (6.8 g/100 g) | 26% of total amine groups (7.2 g/100 g) |

In a conventional alkoxylation reaction, the composition including the PEI is charged into a reactor with the catalyst. Water, which is optionally present in the composition after making the PEI, is stripped out of the composition. The PEI in the composition is then alkoxylated with alkylene oxide to make the APEI product.

Alternatively, the composition including the PEI may be further processed before making the APEI product. For example, if a molecular weight of the APEI product is high, the amount of PEI in the reactor may become too small for agitation. In such instances the PEI in the composition may be partially alkoxylated with alkylene oxide, in an amount less than a fall charge of the alkylene oxide required to make the APEI product, to form a composition including APEI intermediate of lower molecular weight than the APEI product. It is well known in the art that solvents such as water, with good hydrogen bonding ability, will accelerate epoxy amine reactions. Therefore, it is advantageous to form the composition including the APEI intermediate from the composition including the PEI with water as an accelerator.

After catalyzing the composition for further alkoxylation, the presence of water in the composition including the APEI intermediate, formed from the PEI, is undesirable because side reactions take place between the water and additional alkylene oxide that is present during alkoxylation of the APEI intermediate in the composition to make the APEI product, thus forming impurities in the APEI product. As a result, any water that is present in the composition must be stripped at some time before the APEI intermediate in the composition is alkoxylated to make the APEI product in order to avoid formation of the impurities, such as polyethylene glycol. Furthermore, when the carbonic acid is the catalyst used to form the PEI, the carbonate ion that results from the interaction of the carbon dioxide and water reacts with the functionality of the PEI in the composition to form a carbonate adduct. Further reaction between the carbonic acid and the PEI in the composition may also produce a carbamate adduct in the composition. Similar adducts may be formed when the other catalysts are used. As a result, when the carbonic acid is the catalyst used to form the PEI, the composition typically includes carbonate/carbamate adducts; however, the carbonate adducts are typically more prevalent than the carbamate adducts. Carbonate/carbamate adducts are thermally unstable and, if present in the composition including the PEI or the APEI intermediate, will react with KOH or any other alkaline catalyst employed in the alkoxylation process, thereby forming stable potassium carbonate or the corresponding alkali metal carbonate.

It was found that the primary cause for the discoloration of aqueous solutions of the APEIs was mainly due to the presence of the adduct resulting from the reaction between the PEI and conjugate bases formed from the catalysts. As a result, a method of the present invention includes treating the composition including the adduct of the conjugate base and the PEI and a component selected from the group of PEI, APEI intermediate, and combinations thereof to decompose the adduct. By decomposing the adduct, PEI is freed from the adduct and the resulting conjugate base or derivative thereof is removed. The method of treatment results in improved appearance of the aqueous solutions including the APEI product, including improved coloration. Notably, according to the present invention, either the composition including the PEI, the composition including the APEI intermediate, or a composition including a combination of PEI and APEI intermediate can be subjected to the method of treatment to decompose the adduct.

To treat the composition including the adduct and the component selected from the group of PEI, APEI intermediate, and combinations thereof, the composition is heated to a temperature of from 158 to 338° F. for a period of at least 3 hours in the absence of additional water, other than the water remaining after the PEI is made, in order to decompose the adduct. Additionally, the composition is typically subjected to a pressure of from 0.1 to 250 mm Hg to effectively create a vacuum. A non-condensable gas sparge may also be used, and the composition may be subjected to agitation to aid in decomposition of the adduct and removal of the catalyst, such as carbon dioxide. The non-condensable gas is selected from the group of, but is not limited to, nitrogen, argon, and combinations thereof.

The composition may include water that remains after the PEI is made, as well as other impurities. In one embodiment, the water and other impurities, in addition to some of the adduct, may be stripped from the composition to substantially remove the water from the composition. Typically, the water content in the compositions after stripping is less than or equal to 2 parts by weight based on the total weight of the composition. When the composition includes the APEI intermediate, water used as the accelerator may be present in the composition. The composition including the APEI intermediate may also be stripped to substantially remove the water from the composition. Typically, the composition is stripped prior to heating the composition to decompose the adduct. It is to be appreciated that higher temperatures require less time to strip the composition and obtain the specified water content, and that higher initial water content requires longer stripping times. In another embodiment, the composition is not stripped, and the water is still present in the composition at the commencement of the step of heating the composition to decompose the adduct. As such, the step of heating the composition to decompose the adduct may take longer than 3 hours in order to concomitantly strip the water from the composition.

The composition including the component selected from the group of PEI, APEI intermediate, and combinations thereof is also typically heated substantially in the absence of alkylene oxide. For example, in one embodiment, the PEI in the composition is partially alkoxylated with alkylene oxide, typically, with about 1 alkylene oxide molecule for each functionality of the PEI, to form the composition including the APEI intermediate. The partial alkoxylation may occur at a temperature of from 212 to 302° F. until pressure remains constant for two fifteen minute intervals, which indicates substantially complete consumption of the alkylene oxide. After partial alkoxylation, the composition may be heated at the temperature of from 158 to 338° F. for at least three hours to sufficiently decompose the adduct. In another embodiment, no alkylene oxide is added to the composition prior to the step of heating the composition to decompose the adduct.

The time to decompose the adduct depends on the temperature at which the composition is heated to decompose the adduct. More specifically, a composition that is heated at a temperature of from about 200 to about 250° F., typically about 212° F., typically requires a period of from 6 to 9 hours to effectively decompose the adduct, while a composition that is heated at a temperature of from about 250 to about 300° F., typically about 275° F., typically required a period of from about 3 hours to about 6 hours, typically about 3 hours, to effectively decompose the adduct. The step of heating the composition to decompose the adduct may take up to 9 hours, depending upon whether or not agitation and gas sparging are used.

The method of treatment of the present invention may be performed at any time before hydroxide addition and alkoxylation of the PEI and/or the APEI intermediate in the composition to make the APEI product. For example, the method of treatment may be performed at the site of production of the composition including the PEI and/or the APEI intermediate or at the site of alkoxylation of the PEI and/or APEI intermediate in the composition. Furthermore, as alluded to above, the method of treatment may be performed after the PEI in the composition is partially alkoxylated to form the APEI intermediate.

Aqueous solutions of from 70 to 90 parts by weight of the APEI product, based on the total weight of the aqueous solution, exhibit good Gardner color values in the range of from 2 to 3. Similar Gardner color values are also achieved through another method, specifically a method of treating a composition including impurities and a component selected from the group of polyethyleneimine, alkoxylated polyethyleneimine intermediate, and combinations thereof, as set forth in PCT Application No. PCT/US2006/004466 entitled "Method of Making an Alkoxylated Polyethyleneimine Product", and filed on even date herewith, the disclosure of which is hereby incorporated by reference in its entirety. Aqueous solutions of APEI product made from the composition including PEI via the APEI intermediate, not subjected to the method of treatment of the present invention, have Gardner color values, as measured in accordance with ASTM D 1544-04, of 8 or higher.

Due to logistical and operational considerations, the composition including the PEI may be made at one facility and shipped to other facilities, where logistics may allow for more efficient delivery of the APEI product made therefrom. Alternatively, the composition including the APEI intermediate may be formed from the composition including the PEI. An advantage to the formation of the composition including the APEI intermediate, in addition to the advantages set forth above, is that the composition may be manufactured and stored to cut down on production inefficiencies.

In one embodiment, the composition including the component selected from the group of PEI, APEI intermediate, and combinations thereof may be made at the same facility as the APEI product. Due to spatial constraints and the shear volume of APEI product produced from the composition including the PEI, the composition including the PEI may be produced at one facility and shipped to other facilities, where logistics may allow for more efficient delivery of the APEI product. Alternatively, the PEI in the composition may be partially alkoxylated with alkylene oxide to form the composition including the APEI intermediate to cut down on production inefficiencies. Typically, the APEI intermediate in the composition has about 1 alkylene oxide molecule for each functionality of the PEI.

A typical PEI used in the method of the present invention has an average functionality of about 14. That is, on average, 14 functional groups (N—H functionalities) are present on each PEI molecule. To form the APEI product by way of the composition including the APEI intermediate, the PEI in the composition is partially alkoxylated with only a portion of the total alkylene oxide to be used, thus resulting in the composition including the APEI intermediate. Then, the APEI intermediate in the composition is alkoxylated with the rest of the alkylene oxide under base catalysis to effectively form the APEI product. To form the APEI product, the PEI and/or APEI intermediate in the composition is alkoxylated with a total of from 5 to 40 alkylene oxide molecules for each functionality of the PEI. Preferably, the PEI and/or APEI intermediate in the composition is alkoxylated with from 10 to 30, more preferably about 20, alkylene oxide molecules for each functionality of the PEI, to make the APEI product. Since the PEI has about 14 functionalities, the APEI product has from 70 to 560 moles of alkylene oxide for each mole of PEI.

After alkoxylating the PEI or the APEI intermediate in the composition to form the APEI product, a borohydride selected from the group of potassium borohydride, sodium borohydride, and combinations thereof can be added to the APEI product. The borohydride is typically present in an amount of from 0.02 to 0.5 parts by weight based on the total weight of the APEI product to minimize the formation of color forming bodies or other undesirable compounds like aldehydes upon storage of the APEI product.

A hydroxide selected from the group of potassium hydroxide, sodium hydroxide, and combinations thereof may also be added to the composition including the component selected from the group of the PEI, the APEI intermediate, and combinations thereof to catalyze the alkoxylation of the PEI and/or APEI intermediate with the alkylene oxide, provided that the composition is first subjected to the above method of treatment.

The following examples illustrate compositions and Gardner color values that may be obtained for aqueous solutions of APEI product produced using various components and methods outlined above.

EXAMPLE 1

An autoclave is purged with nitrogen before charging 512.8 g of a composition including an adduct of a conjugate base and PEI having a number average of molecular weight of 600 into the autoclave. The composition including the PEI is then stripped at 212° F. for six hours under a vacuum of from 20 to 40 mm Hg and nitrogen sparge. 2 g of $KBH_4$ are charged into the autoclave. After adding the $KBH_4$ to the composition in the reactor, the mixture is subjected to a purification process by further heating to about 125° C. (257° F.) with agitation for three more hours under vacuum and nitrogen sparge. After the three hour period, which marks the end of the purification process, the autoclave is cooled to less than 60° C. (140° F.), vented, and 99.5 g of water are charged into the autoclave. The contents of the autoclave are stirred for fifteen minutes at 55° C. (131° F.). After the fifteen minute time period, the autoclave is heated to a temperature of from 120 to 125° C. (248 to 257° F.) and the pressure is adjusted to about 34 psig (about 2500 mmHg) under nitrogen pad.

The PEI in the composition is then ethoxylated by reacting about 10.6 kg of ethylene oxide (EO) with the PEI to form an EPEI product with 20 equivalents of EO for each functionality of the PEI. More specifically, the PEI in the composition is partially alkoxylated by adding a portion of the EO to the autoclave at less than 90 psig (about 5400 mmHg) to make the composition including ethoxylated polyethyleneimine (EPEI) intermediate. After the desired amount of the EO is in the autoclave, the autoclave is maintained in the temperature range of from 248 to 257° F. for a period of ninety minutes or until the pressure in the reactor remains constant for two consecutive fifteen minute intervals. The composition including the EPEI intermediate is cooled to a temperature of from 104 to 122° F. and poured into a container.

The EPEI product is then made from the composition including the EPEI intermediate. The procedure for making the EPEI product includes adding the composition including the EPEI intermediate into a clean, dry, nitrogen-purged autoclave along with 14.2 g of a 45% solution of potassium hydroxide. An agitator is started at low speed. The autoclave is sealed, purged, and pressure-checked for leaks per normal procedure. The contents of the autoclave are mixed for 10 minutes and the autoclave is heated to a temperature of from 287 to 299° F. The autoclave is then evacuated to less than 10 mm Hg to remove the water and water of catalysis from the composition including the EPEI intermediate. After the water is stripped, the vacuum is released and the composition in the autoclave is heated again to a temperature of from 287 to 299° F., the pressure is adjusted to about 1758 mm Hg (34 psig), and the agitation rate is established at 400 rpm. The rest of the EO is added at a rate of 16 g/minute and the pressure of the autoclave is maintained below 4650 mm Hg (90 psig) until all of the EO is charged. During EO addition, the temperature is allowed to rise to from 302 to 320° F. with the aid of the exothermic reaction. The reaction between the EO and the EPEI intermediate in the composition is continued at the temperature of from 302 to 320° F. for another 30 minutes, or until constant pressure is achieved, whichever occurs first, to produce the EPEI product. The autoclave is vented to atmospheric pressure and agitation is slowed to from 150 to 200 rpm. The EPEI product in the autoclave is vacuum stripped for about thirty minutes at a temperature of about 212° F. and a pressure of less than 100 mm Hg. The vacuum is relieved with nitrogen. Optionally, from 0.02 to 0.5 parts by weight $KBH_4$, based on the total weight of the EPEI product, may be added to the EPEI product. The EPEI product is stirred for thirty minutes at 176° F. before cooling to a temperature of less than 176° F. and adding water to create an aqueous solution of from 70 to 90 parts by weight of the EPEI product, based on the total weight of the aqueous solution with further cooling to a temperature of from 131 to 149° F. The aqueous solution of the EPEI product is then stirred for another thirty minutes. The aqueous solution of the EPEI product is then cooled to a temperature of from 113 to 122° F. before pouring the aqueous solution into a jar. Gardner color values for aqueous solution of the EPEI product made according to the above method is about 4.

EXAMPLE 2

An autoclave is purged with nitrogen before charging 512.8 g of a composition including an adduct of a conjugate base and PEI having a number average of molecular weight of 600 into the autoclave. 99.5 g of water are then charged into the autoclave. The composition in the autoclave is stirred for fifteen minutes at about 131° F. The autoclave is then pressure checked and vented to 5 psig (about 1018 mm Hg). After the fifteen minute time period, the autoclave is heated to a temperature of from 248 to 257° F. and the pressure is adjusted to about 34 psig (about 2500 mmHg) under nitrogen pad.

The PEI in the composition is then ethoxylated by reacting about 10.6 kg of ethylene oxide (EO) with the PEI in the composition to form an EPEI product with about 20 equivalents of EO for each functionality of the PEI in the composition. More specifically, the PEI in the composition is partially ethoxylated by adding a portion of the EO to the autoclave at less than 90 psig (about 5400 mmHg) to make a composition including the EPEI intermediate. After the desired amount of the EO is in the autoclave, the autoclave is maintained in the temperature range of from 248 to 257° F. for a period of ninety minutes or until the pressure in the autoclave remains constant for two consecutive fifteen minute intervals. The composition including the EPEI intermediate is cooled to a temperature of from 104 to 122° F. and poured into a container.

Prior to making the EPEI product from the composition including the EPEI intermediate, the composition including the EPEI intermediate is subjected to a method of treatment by heating the composition to a temperature of about 275° F. for six hours under 10 to 40 mm Hg and nitrogen sparge to decompose the adduct in the composition. Optionally, from 0.02 to 0.5 parts by weight $KBH_4$, based on the total weight of the EPEI product, may be added to the EPEI product. An aqueous solution of from 70 to 90 parts by weight of the EPEI product, based on the total weight of the aqueous solution, is then made from the composition including the EPEI intermediate in the same way as described in Example 1. The aqueous solution of the EPEI intermediate will have a Gardner color value of about 2.

COMPARATIVE EXAMPLE

The same steps are taken as in Example 2, except that the composition including the EPEI intermediate is not heated to decompose the adduct. The resulting composition including the EPEI intermediate is converted to an aqueous solution including from 70 to 90 parts by weight of the EPEI product, based on the total weight of the aqueous solution, through the method described above in Example 1. The aqueous solution of the EPEI product has a brown, coffee color, whereas a light amber color is preferred. Specifically, the Gardner color value for the aqueous solution of the EPEI product of the Comparative Example is about 15.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of treating a composition, said method comprising the steps of:

providing the composition including an adduct of a conjugate base and polyethyleneimine, a component selected from the group of polyethyleneimine made under acid catalysis in water, alkoxylated polyethyleneimine intermediate, and combinations thereof, and, optionally, water remaining after the polyethyleneimine is made or water used as an accelerator to form the alkoxylated polyethyleneimine intermediate;

substantially decomposing the adduct in the composition by heating the composition at a temperature of from 158 to 338° F. for a period of at least 3 hours in the absence of additional water; and stripping any water that is present in the composition to substantially remove the water from the composition prior to decomposing the adduct.

2. A method as set forth in claim 1 wherein the adduct is substantially decomposed substantially in the absence of alkylene oxide.

3. A method as set forth in claim 1 wherein the composition includes less than or equal to 2 parts by weight water, based on the total weight of the composition, after stripping the composition.

4. A method as set forth in claim 1 wherein the composition is heated at a temperature of from about 200 to about 250° F.

5. A method as set forth in claim 4 wherein the composition is heated for a period of from about 6 hours to about 9 hours.

6. A method as set forth in claim 1 wherein the composition is heated at a temperature of from about 250 to about 300° F.

7. A method as set forth in claim 6 wherein the composition is heated for a period of from about 3 hours to about 6 hours.

8. A method as set forth in claim 1 wherein the composition is heated at a pressure of from 0.1 to 250 mm Hg.

9. A method as set forth in claim 1 wherein the water is stripped in the presence of a non-condensable gas sparge.

10. A method as set forth in claim 1 further comprising the step of agitating the composition during the step of heating the composition.

11. A method as set forth in claim 1 wherein the polyethyleneimine in the composition has a number average molecular weight of at least 150.

12. A method as set forth in claim 1 wherein the alkoxylated polyethyleneimine intermediate in the composition has a number average molecular weight of at least 1000.

13. A method as set forth in claim 1 wherein the composition is substantially free of alkoxylated polyethyleneimine intermediate.

14. A method of making an alkoxylated polyethyleneimine product comprising the steps of:

providing a composition including an adduct of a conjugate base and polyethyleneimine, a component selected from the group of polyethyleneimine made under acid catalysis in water, alkoxylated polyethyleneimine intermediate, and combinations thereof, and, optionally, water remaining after the polyethyleneimine is made or water used as an accelerator to form the alkoxylated polyethyleneimine intermediate;

substantially decomposing the adduct in the composition by heating the composition at a temperature of from 158 to 338° F. for a period of at least 3 hours in the absence of additional water;

stripping any water that is present in the composition to substantially remove the water from the composition prior to heating the composition to decompose the adduct; and alkoxylating the component to make the alkoxylated polyethyleneimine product.

15. A method as set forth in claim 14 wherein the adduct is substantially decomposed substantially in the absence of alkylene oxide.

16. A method as set forth in claim 14 wherein the composition includes less than or equal to 2 parts by weight water, based on the total weight of the composition, after stripping the composition.

17. A method as set forth in claim 14 wherein the composition is heated at a pressure of from 0.1 to 250 mm Hg.

18. A method as set forth in claim 14 wherein the composition is heated in the presence of a non-condensable gas sparge.

19. A method as set forth in claim 14 further comprising the step of agitating the composition during the step of heating the composition.

20. A method as set forth in claim 14 wherein the polyethyleneimine has a number average molecular weight of at least 150.

21. A method as set forth in claim 14 where the alkoxylated polyethyleneimine intermediate has about 1 mole of alkylene oxide for each functionality of the polyethyleneimine.

22. A method as set forth in claim 14 further comprising the step of adding hydroxide selected from the group of potassium hydroxide, sodium hydroxide, and combinations thereof to the composition prior to alkoxylating and subsequent to substantially decomposing the adduct.

23. A method as set forth in claim 22 wherein the component in the composition is alkoxylated with from 5 to 40 alkylene oxide molecules for each functionality of the polyethyleneimine to make the alkoxylated polyethyleneimine product.

24. A method as set forth in claim 23 further comprising the step of forming an aqueous solution including from 70 to 90 parts by weight of the alkoxylated polyethyleneimine product based on the total weight of the aqueous solution.

25. A method as set forth in claim 24 wherein the aqueous solution of the alkoxylated polyethyleneimine product has a Gardner color value of less than or equal to 6 as measured in accordance with ASTM D 1544-04.

26. A method as set forth in claim 14 further comprising the step of partially alkoxylating polyethyleneimine with an alkylene oxide to form the composition including the alkoxylated polyethyleneimine intermediate.

27. A method as set forth in claim 26 where the alkoxylated polyethyleneimine intermediate has about 1 alkylene oxide molecule for each functionality of the polyethyleneimine.

28. A method as set forth in claim 26 further comprising the step of adding hydroxide selected from the group of potassium hydroxide, sodium hydroxide, and combinations thereof to the composition prior to alkoxylating and subsequent to substantially decomposing the adduct.

29. A method as set forth in claim 28 wherein the alkoxylated polyethyleneimine intermediate in the composition is alkoxylated with a balance of the alkylene oxide to obtain from 5 to 40 alkylene oxide molecules for each functionality of the polyethyleneimine to make the alkoxylated polyethyleneimine product.

30. A method as set forth in claim 29 further comprising the step of forming an aqueous solution including from 70 to 90 parts by weight of the alkoxylated polyethyleneimine product based on the total weight of the aqueous solution.

31. A method as set forth in claim 30 wherein the alkoxylated polyethyleneimine product has a Gardner color value of less than or equal to 6 as measured in accordance with ASTM D 1544-04.

32. A method as set forth in claim 14 further comprising the step of adding a borohydride selected from the group of potassium borohydride, sodium borohydride, and combinations thereof to the alkoxylated polyethyleneimine product.

* * * * *